US007518107B2

(12) United States Patent
Gabeler

(10) Patent No.: US 7,518,107 B2
(45) Date of Patent: Apr. 14, 2009

(54) METHODS AND APPARATUS FOR TIME-OF-FLIGHT MASS SPECTROMETER

(75) Inventor: Stephen C. Gabeler, Sudbury, MA (US)

(73) Assignees: Applied Biosystems, LLC, Foster City, CA (US); MDS Inc., Concord, CA (US)

( * ) Notice: Subject to any disclaimer, the term of this patent is extended or adjusted under 35 U.S.C. 154(b) by 366 days.

(21) Appl. No.: 11/548,322

(22) Filed: Oct. 11, 2006

(65) Prior Publication Data

US 2008/0087810 A1 Apr. 17, 2008

(51) Int. Cl.
*B01D 59/44* (2006.01)

(52) U.S. Cl. ....................... 250/287; 250/286; 250/288; 250/281; 250/282; 702/85; 702/99

(58) Field of Classification Search ................. 250/281, 250/282, 286, 287, 288; 702/85, 99
See application file for complete search history.

(56) References Cited

U.S. PATENT DOCUMENTS 6,049,077 A * 4/2000 Franzen ...................... 250/287
6,465,777 B1 10/2002 Rache
6,700,118 B2 * 3/2004 Yefchak et al. ............. 250/287
7,183,543 B1 * 2/2007 Overney et al. ............. 250/287
2003/0034448 A1 * 2/2003 Yefchak et al. ............. 250/282
2004/0031918 A1 * 2/2004 Schoen et al. ............... 250/282
2005/0023454 A1 * 2/2005 Bateman et al. ............. 250/288
2006/0043283 A1 * 3/2006 Davis et al. ................. 250/287

* cited by examiner

*Primary Examiner*—Jack I Berman
*Assistant Examiner*—Michael J Logie
(74) *Attorney, Agent, or Firm*—Andrew T. Karnakis

(57) ABSTRACT

Disclosed are methods and apparatus for compensating for mass error for a time-of-flight mass spectrometer. A reference flight distance for a pulse of ions corresponding to a reference temperature of one or more components of an ion flight path assembly is determined, and the temperature of one or more components of the ion flight path assembly is measured. Correlating the thermal expansion of the flight path assembly with the temperature measurement allows the measured flight times to be adjusted to correspond with the reference flight distance to thereby compensate for the thermal expansion of the flight path assembly. A mass spectrum is obtained using the adjusted flight times. In various embodiments, the temperature signal is used with pre-determined thermal expansion correction factors for the flight path assembly to calculate a correction factor to control another component of the TOF MS, such as the voltage applied to a power supply system or a signal to control clock frequencies.

9 Claims, 4 Drawing Sheets

METHODS AND APPARATUS FOR TIME-OF-FLIGHT MASS SPECTROMETER

The present teachings relate to methods and apparatus for mass spectrometry, and more specifically, the present teachings relate to methods and apparatus for time-of-flight mass spectrometry.

One application for mass spectrometry is directed to the study of biological samples, where sample molecules are converted into ions, in an ionization step, and then detected by a mass analyzer, in mass separation and detection steps. Various types of ionization techniques are presently known, which typically create ions in a region of nominal atmospheric pressure or within vacuum. Mass analyzers can be quadrupole analyzers where RF/DC ion guides are used for transmitting ions within a narrow slice of mass-to-charge ratio (m/z) values, magnetic sector analyzers where a large magnetic field exerts a force perpendicular to the ion motion to deflect ions according to their m/z and time-of-flight ("TOF") analyzers where measuring the flight time for each ion allows the determination of its m/z.

Time-of-flight mass spectrometers, TOF MS, are advantageous because they are instruments with virtually unlimited mass-to-charge ratio range and with potentially higher sensitivity than scanning instruments because they can record all the ions generated from each ionization step. Time-of-flight mass spectrometers measure the mass of an ion indirectly by accelerating the ion in a vacuum to a fixed energy and measuring the time of flight over a fixed distance to a detector. Variations of the energy, the distance or the measurement of time, however, may produce errors in measured mass. Some of these variations may result from components of the system with parameters that may vary with changes in temperature.

There are certain techniques that can be applied, for example, to power supplies and clocks for reducing the affects due to the temperature coefficient of various components within the TOF MS. These include temperature compensation, where components with equal and opposite temperature coefficients are employed, and oven control to directly regulate the temperature of sensitive components. Typically, TCXO and OCXO are the common terms used to represent temperature controlled crystal oscillators and oven controlled crystal oscillators respectively. Oven control of voltage references has been used in voltage calibrators and in integrated circuit voltage references. Close matching of temperature coefficients of the high voltage resistors used in feedback dividers has been used in high voltage power supplies to compensate for a significant source of drift. Oven control of critical components in high voltage power supplies can be an extension of these techniques. After these techniques are applied, the remaining challenge is to take into account the drift caused by thermal expansion effects on the flight distance of the ions from source to detector.

It has been proposed to control the temperature of the materials in the TOF MS that undergo expansion and that have an impact on the time-of-flight measurement, but this can be costly and ineffective due to thermal time constants of the affected materials.

Another technique for dealing with the problems of mass drift errors is to run periodic calibrations using known mass standards to tune the TOF MS and eliminate these errors. Yet running calibrations too frequently when such calibration may be unnecessary results in downtime from sample analysis which has an undesirable effect for high throughput analyses. Improvements to reduce the drift rate will in turn reduce the frequency of calibrations required to maintain a given error limit.

SUMMARY

In view of the foregoing, the present teachings provide improved methods and apparatus for conducting time-of-flight mass spectrometry. In various embodiments, the method comprises establishing a reference flight distance for a pulse of ions corresponding to a reference temperature of one or more components of an ion flight path assembly; obtaining a temperature measurement of the one or more components of the ion flight path assembly; correlating a thermal expansion of the flight path assembly with the temperature measurement; compensating for the thermal expansion of the flight path assembly by adjusting the flight times of the ions to correspond with the reference flight distance; and obtaining a mass spectrum using the adjusted flight times. In various embodiments, a mass spectrometer comprises a flight path assembly comprising one or more ion optic components for providing a transmission path configured for obtaining the time-of-flight for ions to be analyzed, a temperature sensor mounted on one or more components of the assembly for obtaining a temperature measurement of the flight path assembly, a power supply system connected to one or more of the ion optic components, the power supply system being adjustable in response to signal that is a function of the temperature measurement for providing one or more adjusted flight time parameters, and wherein the mass spectrum is obtained using one or more of the adjusted flight-time parameters to compensate for the thermal expansion of the flight path assembly. In various embodiments, the temperature signal is used with pre-determined thermal expansion correction factors for the flight path assembly to calculate a correction factor to control another component of the TOF MS, such as a power supply system. The power supply system can be controlled by a system controller where the controller applies the correction factor to adjust the voltage to one or more ion optic components within the flight path assembly to compensate for the ion flight times.

In various embodiments, variation of other parameters that influence the time of flight measurement can be used to control a different component of the analyzer to compensate for errors in ion flight times. For example, control of clock frequencies can be used to correct for errors due to thermal expansion of the ion flight path assembly.

These and other features of the present teachings are set forth herein.

BRIEF DESCRIPTION OF THE DRAWINGS

The skilled person in the art will understand that the drawings, described below, are for illustration purposes only. The drawings are not intended to limit the scope of the present teachings in any way.

In the accompanying drawings.

In the drawings, like reference numerals indicate like parts.

DESCRIPTION OF VARIOUS EMBODIMENTS

Figure 1:
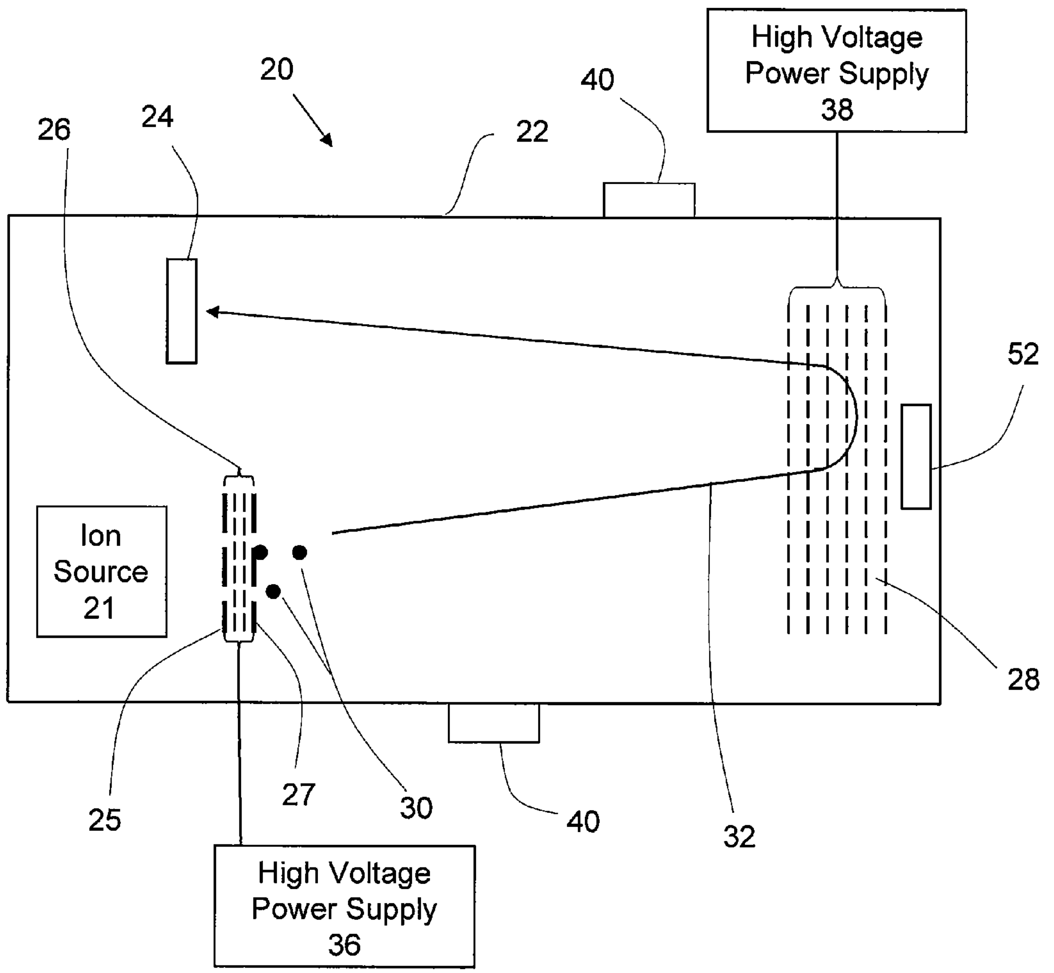
FIG. 1 is a schematic view of a time-of-flight mass spectrometer according to the present teachings.

It should be understood that the phrase "a" or "an" used in conjunction with the present teachings with reference to various elements encompasses "one or more" or "at least one" unless the context clearly indicates otherwise. Reference is first made to FIG. 1, which shows schematically a time-of-flight mass analyzer, generally indicated by reference number 20. In various embodiments, the time-of-flight mass analyzer has an ion source 21, which generally includes a sample support 25 from which ions are desorbed, one or more ion detectors 24, 52 and ion optic components comprising an electrostatic ion accelerator 26 and an electrostatic mirror 28, all located within a vacuum housing 22. The optical and mechanical components through which the ions traverse from source to detector define an ion flight path assembly. In the schematic representation of FIG. 1, the principal components of the ion flight path assembly comprise the vacuum housing 22, the sample support 25, the ion accelerator 26, the mirror 28 and the detectors 24, 52. However, as is well understood by those of skill in the art, other mechanical components, such as fasteners, hangers, mounting supports (all not shown in FIG. 1), that position and hold the principal components within the TOF MS can be part of the flight path assembly. In various embodiments, the source, detectors and optic components can be mounted within the vacuum housing 22 maintained at high vacuum conditions and the housing can share components with the ion flight path assembly through direct mounting of such components to the housing. In various embodiments, a separate flight tube through which the ions travel can be mounted at one end of the housing and the components of the ion flight path assembly may not be mounted directly to the vacuum housing. Temperature sensors 40 can be mounted on various locations of the flight path assembly for providing one or more temperature measurements as will be discussed below. High voltage power supplies 36 and 38 can be connected to the accelerator 26 and mirror 28 respectively. The term "ion source" as used herein encompasses both actual ion sources where ions are generated and virtual ion sources as discussed immediately below. In various embodiments, the ion source 21 for the mass analyzer 20 can be a matrix-assisted laser desorption/ionization (MALDI) source where ions are generated from a sample deposited on the support 25 upon being irradiated by a laser. The sample support can be the first electrode of the ion accelerator. In various embodiments, the ion source 21 can be positioned external to the vacuum housing 22 and the ions transmitted from the ion source to the accelerator through the use of ion guides. In various embodiments, the ion source can also comprise a virtual ion source that provides a timing point for ion origination but does not necessarily create ions from neutrals, such as, e.g., at the exit of collision cells employing delayed ion extraction techniques, or at deflector regions employed in orthogonal time-of-flight (o TOF), instruments.

In various embodiments, in a time of flight mass spectrometer, ions can be produced in the ion source 21 and a pulse of ions 30 can be accelerated through an electric field presented by the accelerator 26 through the application of an electrostatic potential between the sample support 25 and a second electrode 27. The pulse of ions 30 fly a fixed distance, commonly referred as the flight distance, to the detector 24 and the detector produces corresponding signals at the times that the ions arrive. In various embodiments, the flight distance can be the distance defined by the path from the sample support 25 to the electrostatic mirror 28 and from the electrostatic mirror 28 to the detector 24, such as in a reflector TOF MS. In various embodiments, the flight distance can be the distance defined by the path from the sample support 25 to the detector 52 with no voltage applied to the mirror 28, such as in a linear TOF MS. It will also be apparent that the detector can be positioned at intermediate locations along the path. The detector signal can be sampled using a fixed frequency clock starting at or near the time when the pulse of ions 30 is accelerated by ion accelerator 26. Time can be measured by the count of clock ticks divided by the clock frequency. This clock tick count, interpolated to a fraction of a tick, represents the measured flight time. The measured flight time in clock ticks is proportional to the flight time in seconds assuming a fixed and stable clock frequency. Centroids of signal pulses can be computed producing time measurements to a resolution that is finer than the clock period. The energy given to the ions can be determined by the power supplies 36, 38 and the flight distance can be determined by the assembly of mechanical and optical components that comprise the ion flight path assembly, which can be an assembly of various materials having different physical properties. Each of the above mentioned parameters contribute to the final determination of the mass of each ion in the pulse of ions 30.

A basic equation relating the parameters of energy, time and distance is the equation for the kinetic energy of a moving mass. The heavier ions fly slower than the lighter ones so they arrive later. The mass of the ion is then calculated from the measured time. From basic Newtonian physics, the energy (E) of a moving object is related to its mass (m) and velocity (v) by:

$$E = \frac{1}{2}mv^2 = \frac{1}{2}m\left(\frac{l}{t}\right)^2 \tag{1}$$

In equation (1), l is the length of the flight path or simply the flight distance and t is the time. The energy of a charged ion accelerated through an electric field is equal to the voltage (V) times the number of charges (z), so:

$$E = Vz = \frac{1}{2}m\left(\frac{l}{t}\right)^2 \tag{2}$$

$$V = \frac{1}{2}\left(\frac{m}{z}\right)\left(\frac{l}{t}\right)^2 \tag{3}$$

Equation (3) represents a basic equation for TOF MS. Solving this equation for mass (actually m/z) gives:

$$\frac{m}{z} = 2V\left(\frac{t}{l}\right)^2 \tag{4}$$

As more ion optic elements are added for added functionality and performance improvements, the equation of motion for the ions can become more complex. For example, there can be a delay time or time offset $t_0$, from the measured start of the flight to the actual start due to signal propagation delays inherent in cables and in the electronic components. This delay time must be subtracted from the measured flight time to get the actual flight time. The accelerating voltage and the length of the flight path are held constant so the form of equation (4) becomes:

$$\frac{m}{z} = K_1(t - t_0)^2 \tag{5}$$

where:

$$K_1 = \frac{2V}{l} \tag{6}$$

From equation (4), we see that the measured mass is a function of voltage, of time and of flight distance. It can be useful to know how a change or a drift of any one of these three parameters will affect the mass accuracy of the TOF MS. As used herein, drift refers to a mass error that is changing over time. To show this, the first partial derivative of equation (4) can be taken with respect to each of the three parameters, while holding the others constant. For simplicity, m/z can be replaced by m:

$$m = 2V\left(\frac{t}{l}\right)^2 = K_2V = K_3t^2 = \frac{K_4}{l^2} \tag{7}$$

where:

$$K_2 = 2\left(\frac{t}{l}\right)^2 \tag{8}$$

$$K_3 = \frac{2V}{l^2} \tag{9}$$

$$K_4 = 2Vt^2 \tag{10}$$

then:

$$\frac{dm}{dV} = K_2 \tag{11}$$

$$\frac{dm}{dt} = 2K_3t \tag{12}$$

$$\frac{dm}{dl} = -2\frac{K_4}{l^3} \tag{13}$$

In practice, drift can be expressed in generic terms by 'parts per million' or ppm. This is one million times the difference in a parameter divided by the value of the parameter. For example, the ppm of mass drift, for a mass difference $\Delta m$, can be expressed as:

$$ppm = \frac{\Delta m}{m} \cdot 10^6 \tag{14}$$

So, rewriting equations (11), (12) and (13) in the form of dm/m according to equation (7) and then in to the 'parts per million' format (the same as $\Delta m/m$) gives three basic sensitivity equations, differentially coupled to the mass drift ($\Delta m/m$):

$$\frac{dm}{m} = \frac{dV}{V} \Rightarrow \frac{\Delta m}{m} = \frac{\Delta V}{V} \tag{15}$$

$$\frac{dm}{m} = 2\frac{dt}{t} \Rightarrow \frac{\Delta m}{m} = 2\frac{\Delta t}{t} \tag{16}$$

$$\frac{dm}{m} = -2\frac{dl}{l} \Rightarrow \frac{\Delta m}{m} = -2\frac{\Delta l}{l} \tag{17}$$

In practice, the differential coupling coefficients found in equations (15), (16) and (17), expressed as constants 1, 2 and −2 respectively, can vary. Techniques for time focusing of ions of the same mass but different energies such as through use of delayed ion extraction and ion mirrors can reduce the coupling coefficients expected from the above equations that describe simpler TOF MS systems. Ion optics components such as Einzel lenses used for spatial focusing and deflectors for ion beam steering have small coupling coefficients for their applied voltages because they influence the ions over a short distance and do not change the net energy of the ions. For example, the coupling coefficient for the voltage on an ion mirror electrode in a time of flight mass spectrometer system such as the 4800 MALDI TOF/TOF™ Analyzer (Applied Biosystems/MDS Sciex) may be measured empirically to be 0.732 rather than 1.000 as might be expected from equation (15) above. These coupling coefficients determined by empirical measurements can be used for mass calibration or compensation purposes as will be described subsequently.

By way of example, in the time of flight equations for simplified linear ion optics geometry a +20 ppm drift in acceleration voltage ($\Delta V/V$) produces a +20 ppm drift in measured mass ($\Delta m/m$) according to equation (15), a +20 ppm drift in the frequency of the clock ($\Delta t/t$) measuring the flight time produces a +40 ppm drift in mass ($\Delta m/m$) according to equation (16), and a +20 ppm change in the length ($\Delta l/l$) of the flight path produces a −40 ppm change in mass ($\Delta m/m$) according to equation (17). In the example of an empirically measured coupling coefficient for an ion mirror of 0.732, a +20 ppm drift of the voltage applied would produce a +14.64 ppm drift in mass. An estimate of mass drift ($\Delta m/m$) based on measurements of other parameters can be compared to a predetermined mass error limit imposed on the TOF MS.

Despite efforts to reduce mass drift and associated mass accuracy errors using the foregoing techniques, a residual drift error that exceeds mass error limits required for certain applications can remain due to the complex nature of the components that interconnect to form the TOF MS system. In various embodiments, a mass calibration step can be performed by using one or more mass standards containing ions of known mass to essentially eliminate, for subsequent analyses, the effect of mass drift. For brevity, the terms calibration mass and known mass can mean the same. A mass spectrum, obtained with the TOF MS of the mass standard, can be correlated with the m/z values of the calibration mass. Subsequently, the correlation between the measured and the known mass can be used to compute calibration factors to arrive at a mass spectrum (peak intensity versus m/z value) from a time-of-flight spectrum (peak intensity versus time) to thus align the measured mass with the calibration m/z values. The calibration factors, in addition to the other parameters previously discussed, can be incorporated into the time-of-flight equations (4) and (5) so that a general form of the equations becomes:

$$m=f(a_0,a_1,a_3, \ldots a_n,t) \tag{18}$$

Where mass m can be a function of time t and of the parameters $a_0, \ldots a_n$, the parameters can be substantially constant but can be a function of temperature as described above.

Equation (18) can be expressed in the form of:

$$\sqrt{m}=a_0+a_1t+a_2t^2+ \ldots a_nt^n \tag{19}$$

Where, for brevity, the generic parameter notations, $a_0, \ldots a_n$, have been used in both equations (18) and (19). These parameters $a_0, \ldots a_n$, can be general and do not necessarily imply that they are the same in each of equations (18) and (19). As will be appreciated by those of skill in the art, the calibration model, equation (19), is still a generalized form and the polynomial powers are not limited to positive integers. Fractional and negative powers can be used as well as other functions of t. In various embodiments, a calibration step can include providing a measurement of a time-of-flight spectrum from a mixture of known mass standards and from the calculation of a best fit of the parameters, $a_n$, according to equation (19). The values of the parameters, $a_n$, can be calculated by applying the mathematical method of least squares as known in the art. This method minimizes the sum of the squares of the residual errors for all of the calibration masses. Frequent calibration with standards, while limiting the effects of thermal drift in the mass spectrometer, takes time away from the analysis of samples. Reduction of thermal drift allows greater time intervals between calibrations for a given maximum error limit.

There are other aspects of the TOF MS instrument which can have an affect on drift, but in the present teachings, the model as exemplified by equations (15), (16), and (17) can be sufficient to describe the major contributors to mass drift. All three parameters, voltage, time and distance, have temperature coefficients and thermal time constants which can contribute to the drift characteristics of the instrument. For example, the power supply electronic components, which provide voltages for ion optics, and the time measurement clock, which provides the timing, can each have temperature coefficient properties affecting the corresponding voltage and time values. The power supply components and the clock, additionally, can each have a thermal time constant, which can attribute to delayed response to any temperature variations. The components of the ion flight path assembly can have thermal expansion coefficients, which can result in altering the flight distance as a response to any temperature variation.

Returning to FIG. 1, in various embodiments, the distance of flight indicated by reference numeral 32 which the ions 30 travel between the sample support 25 and the detector 24 or optionally between the sample support 25 and the detector 52, is a known dimension at a given reference temperature and this distance establishes a reference flight distance for the physical structure of the flight path assembly. In certain circumstances due to temperature effects, the reference flight distance dimension can be altered due to the thermal expansion properties of the materials used in constructing the mechanical components that form the structure of the flight path assembly. These temperature effects can be attributed from various heat sources, including heat dissipation from the power supplies or temperature swings from the surrounding environmental systems (HVAC). Regardless of the origins of the heat source, dimensional changes affecting a change in the reference flight distance can occur over short or long periods. Consequently, the mass spectrum obtained with the altered distance can show significant mass accuracy errors because the data was obtained using a presumed constant reference flight distance.

In various embodiments, the present teachings compensate for thermal drift of the measured masses by compensating for the thermal expansion of materials prior to the acquisition of the mass spectrum. Accordingly, when the temperature of the flight path assembly deviates from, for example, an arbitrary reference temperature corresponding to the reference flight distance, the length of the flight path assembly can change according to the linear thermal expansion coefficient of the materials that comprise the flight path assembly. Subsequently, a correction factor corresponding to the changed length of the flight path assembly at the measured temperature can be applied to correct the mass error. Prior to the acquisition of the mass spectrum, the correction factor can be used to adjust, for example, a power supply voltage or clock frequency which in turn adjusts the measured flight times of the ions flying in the changed length so that the mass of the ions obtained with the reference flight distance and the corresponding adjusted flight times can be compensated for the thermal expansion prior to acquisition of the mass spectrum.

Figure 2:
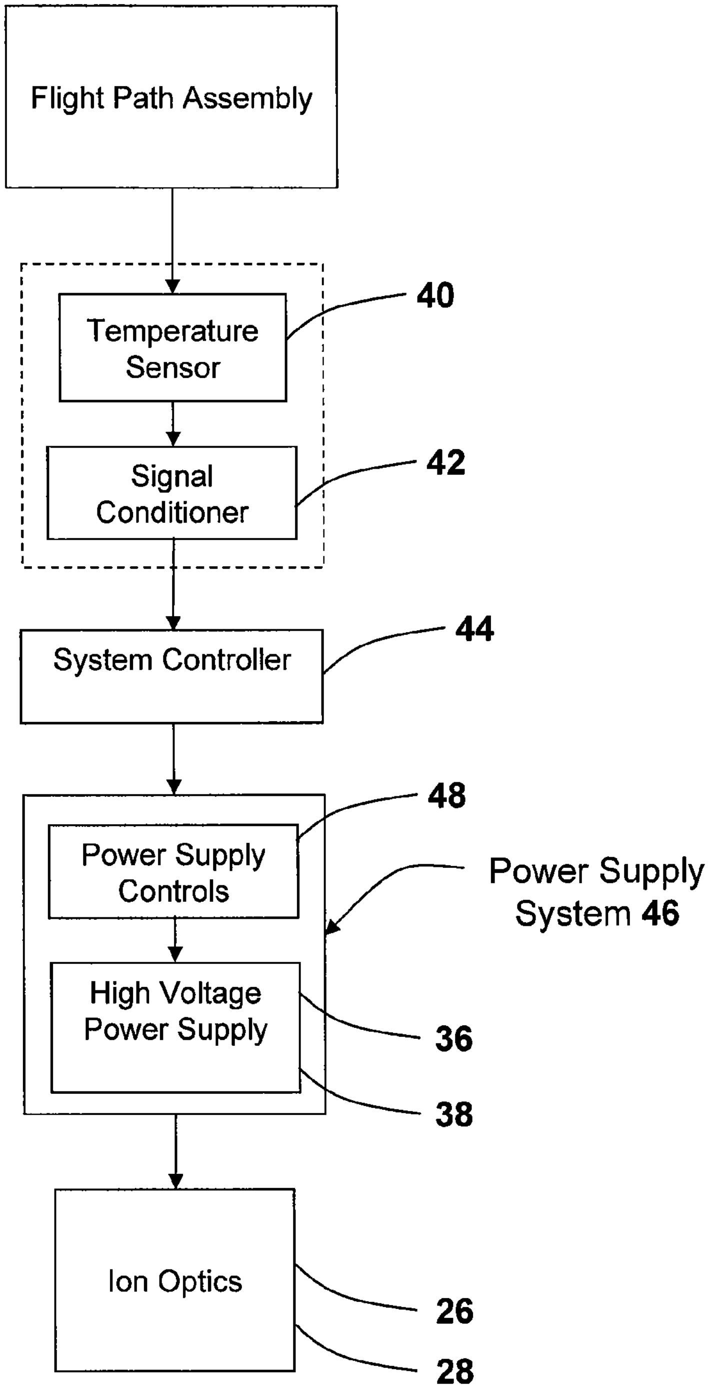
FIGS. 2 to 4 are system block diagrams according to various embodiments of the present teachings.

To demonstrate various embodiments, reference is now made to FIG. 2, which shows a block diagram exemplifying the steps which can be used in obtaining the temperature compensated mass spectrum. As previously indicated, temperature sensors 40 can be mounted on various locations of the flight-path assembly for providing one or more temperature measurements. The sensors 40 can be connected to a signal conditioner 42 configured to deliver a temperature signal to a system controller 44 that is proportional to the temperature of one or more components of the flight path assembly, either localized to the point of the measurement or to indicate an average temperature of the entire flight path assembly.

By way of example, the system controller 44 can store a table of values, such as a table of Δl, that correspond to the expansion of the flight path at various temperatures or equations governing the thermal expansion of the different materials used for the construction of the flight path assembly. For example, the mean thermal coefficient of linear expansion of type 304 stainless steel commonly used for components of the flight path assembly is equal to 17 μm/m/° C., and the table of Δl values, can be derived from this coefficient. The system controller can reference the various temperatures in the table with the actual temperature measurement and make any necessary interpolations to establish the expansion of the flight path assembly that would result from an increased temperature and then to compensate for the expansion by providing a corresponding adjustment to an applied voltage or a clock frequency prior to obtaining the mass spectrum.

In various embodiments, a change in the length of the flight path assembly Δl as a result of the thermal expansion can be compensated by a change in the voltage ΔV according to equations (15) and (17) or their empirical equivalents:

$$-2\frac{\Delta l}{l} = \frac{\Delta V}{V} \Rightarrow \Delta V = -2\frac{\Delta l}{l}V \tag{20}$$

According to equation (20), the system controller 44 can compensate for the thermal expansion of the assembly by providing an appropriate signal to a power supply system 46 that comprises a power supply control 48 and the power supplies 46,48 thereby changing the voltage applied to one or more of the ion optic components within the TOF MS. In effect, the measured flight times of the ions can be altered or adjusted by the voltage applied to one or more of the ion optic components, such as the ion accelerator 26 or the electrostatic mirror 28.

In various embodiments, a change in the length of the flight path assembly Δl as a result of the thermal expansion can be compensated by a change in the clock frequency Δf(=l/Δt) according to equations (16) and (17) or their empirical equivalents:

$$2\frac{\Delta t}{t} = -2\frac{\Delta l}{l} \Rightarrow \Delta t = -\frac{\Delta l}{l}t \tag{21}$$

$$\Rightarrow \Delta f = -\frac{l}{\Delta l}f \tag{22}$$

According to equation (22), the system controller 44 can compensate for the thermal expansion of the assembly by providing an appropriate signal that changes the frequency of the clock used to measure the time of flight. In effect, the measured flight times of the ions can be altered by the frequency of this clock.

While the present teachings are described in conjunction with various embodiments, it is not intended that the present teachings be limited to such embodiments. On the contrary, the present teachings encompass various alternatives, modifications, and equivalents, as will be appreciated by those of skill in the art. For example, the function of the signal conditioner 42 can be incorporated within the temperature sensor 40 so that the temperature sensor 40 can be adapted to directly produce a temperature signal proportional to the temperature of the assembly. This is shown graphically in FIG. 2 by the dotted outline around the temperature sensor 40 and the signal conditioner 42 to indicate the possibility of a unified temperature sensor and signal conditioner unit. Additionally, any temperature measurement providing an indication of the relative temperature of the material being measured can be sufficient to fulfill the requirement of a temperature signal, such as a signal from a thermistor element, a pyrometer or other similar devices. Thus, for brevity, the terms temperature measurement and temperature signal indicate the same functional parameter and the terms can be used interchangeably.

Figure 3:
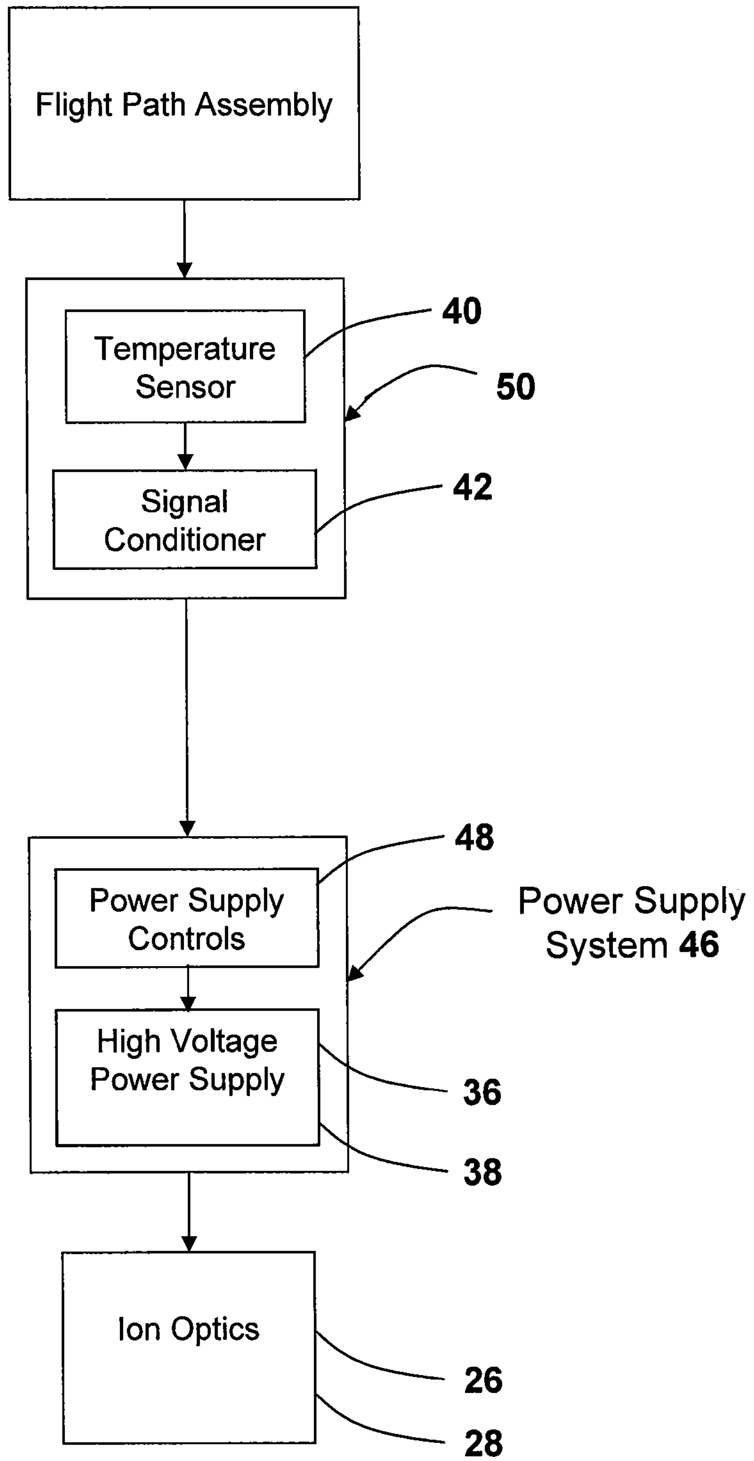
Figure 4:
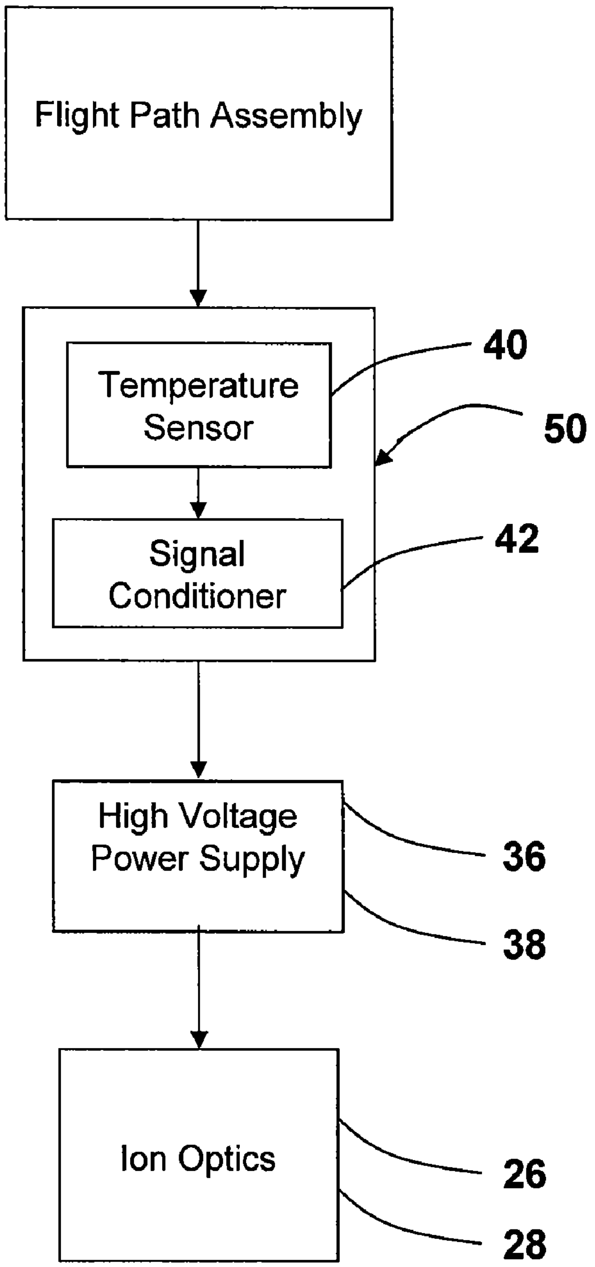

Furthermore, as shown in FIG. 3, the system controller 44 may not be required to relay the temperature signal between the sensor 40 or the signal conditioner 42 and the power supply system 46. For simplicity, the temperature sensor 40 and signal conditioner 42 has been combined into a single unit 50 as indicated by the solid outline. The power supply system 46 can be adapted to use the temperature signal and be capable of adjusting the output voltage accordingly to compensate for the thermal expansion. This can be performed by an internal calibration system configured to calculate the correction factor and to adjust the output provided by the high voltage power supply 38. In addition, as shown in FIG. 4, the system controller 44 has been eliminated and the temperature sensor 40 can relay its signal directly to the high voltage power supply 38 for controlling the voltage to the ion optic components to generate the adjusted flight-time parameters. The high voltage power supply 38 can be configured to provide its own correction factor as a function of the temperature measurement obtained by the temperature sensor and to use the correction factor to adjust the output voltage as required. Alternatively, the high voltage power supply 38 can be configured to be temperature sensitive such that the output voltage can vary as a function of a predetermined temperature profile. The temperature profile can be similar or can be calibrated with the same response as the thermal expansion of the materials incorporated into the flight-path assembly.

The invention claimed is:

1. A method of compensating for mass error for a time-of-flight mass spectrometer comprising:

establishing a reference flight distance for a pulse of ions corresponding to a reference temperature of one or more components of an ion flight path assembly;

obtaining a temperature measurement of the one or more components of the flight path assembly;

correlating a thermal expansion of the flight path assembly with the temperature measurement;

compensating for the thermal expansion of the flight path assembly by adjusting measured flight times of the ions to correspond with the reference flight distance; and obtaining a mass spectrum using the adjusted flight times.

2. The method of claim 1, wherein the temperature measurement is obtained with a temperature sensor mounted on the flight path assembly, and wherein the sensor is adapted to provide a temperature signal proportional to the temperature of the flight path assembly.

3. The method of claim 2, wherein adjusting the flight times comprises controlling a power supply system connected to one or more ion optic components of the mass spectrometer, the components adapted to provide the measured flight times.

4. The method of claim 3, wherein the power supply system comprises a high voltage power supply.

5. The method of claim 4, wherein the power supply system further comprises a power supply controller connected to the high voltage power supply.

6. The method of claim 2, wherein adjusting the flight time comprises applying the temperature signal to a high voltage power supply connected to one or more ion optic components of the mass spectrometer, the components adapted to provide the measured flight times.

7. The method of claim 1, wherein adjusting the flight times comprises providing a signal that changes the frequency of the clock used to measure the time of flight.

8. A time-of-flight mass spectrometer comprising:

a flight path assembly for providing a transmission path configured for obtaining the time-of-flight for ions to be analyzed by the mass spectrometer;

the flight path assembly comprising one or more ion optic components adapted for providing one or more flight-time parameters used for obtaining the time-of-flight of the ions and producing a corresponding mass spectrum of ion intensities versus mass-to-charge values;

a temperature sensor mounted on the assembly, the sensor adapted for obtaining a temperature measurement of one or more components of the flight path assembly;

a power supply system connected to one or more of the ion optic components, the power supply system being adjustable in response to signal that is a function of the temperature measurement for providing one or more adjusted flight time parameters; and wherein the mass spectrum is obtained using one or more of the adjusted flight-time parameters to compensate for the thermal expansion of the flight path assembly.

9. A time-of-flight mass spectrometer comprising:

a flight path assembly comprising one or more components that establish a flight path distance between a pulsed source of ions and a detector of the mass spectrometer;

a controller adapted to measure the time of flight of the ions from the pulsed source to the detector by a clock circuit;

a temperature sensor connected to the controller and to one or more components of the flight path assembly adapted to provide a temperature signal for at least the one or more components, the temperature signal being proportional to the thermal expansion of the flight path assembly;

wherein the controller computes from the temperature signal a correction signal and applies the correction signal to adjust the energy of the ions traversing the flight path assembly or the frequency of the clock circuit used to measure flight times of the ions to adjust the measured flight times of the ions to compensate for thermal expansion of the flight path assembly.

* * * * *